US009728071B2

United States Patent
Janardhanan et al.

(10) Patent No.: US 9,728,071 B2
(45) Date of Patent: Aug. 8, 2017

(54) METHOD OF PERFORMING SENSOR OPERATIONS BASED ON THEIR RELATIVE LOCATION WITH RESPECT TO A USER

(71) Applicant: Honeywell International Inc., Morristown, NJ (US)

(72) Inventors: Shaiju Janardhanan, Bangalore (IN); Hemanth P V, Bangalore (IN); Raghunathan T, Salem (IN); Karthika Gopal, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 102 days.

(21) Appl. No.: 14/645,590

(22) Filed: Mar. 12, 2015

(65) Prior Publication Data
US 2016/0267774 A1 Sep. 15, 2016

(51) Int. Cl.
*G08B 1/08* (2006.01)
*G08B 25/00* (2006.01)
*H04L 29/06* (2006.01)
*H04L 29/08* (2006.01)

(52) U.S. Cl.
CPC .......... *G08B 25/008* (2013.01); *H04L 63/08* (2013.01); *H04L 67/18* (2013.01); *H04L 67/12* (2013.01)

(58) Field of Classification Search
CPC ....... G08B 25/10; G08B 25/016; H04L 67/12; H04L 67/18
USPC ................................ 340/539.11, 541, 565
See application file for complete search history.

(56) References Cited

U.S. PATENT DOCUMENTS

| 9,049,567 | B2* | 6/2015 | Le Guen | G08B 25/10 |
| 9,299,243 | B2* | 3/2016 | Janardhanan | G08B 25/008 |
| 2006/0226973 | A1 | 10/2006 | Catlin | |
| 2009/0054077 | A1* | 2/2009 | Gauthier | G06F 3/014 455/456.1 |
| 2012/0115503 | A1 | 5/2012 | Lynch et al. | |
| 2014/0035742 | A1 | 2/2014 | Sharma et al. | |
| 2014/0132410 | A1 | 5/2014 | Chang | |
| 2015/0052578 | A1* | 2/2015 | Yau | H04W 12/00 726/3 |

(Continued)

FOREIGN PATENT DOCUMENTS

WO 2013096954 A1 6/2013

OTHER PUBLICATIONS

Extended European search report from corresponding EP patent application 16158127.7, dated Jun. 1, 2016.

*Primary Examiner* — Eric M Blount
(74) *Attorney, Agent, or Firm* — Husch Blackwell LLP

(57) ABSTRACT

An apparatus and system are provided that include providing a plurality of wireless sensors of a security system that detect threats within a secured geographic area, displaying a list of at least some of the plurality of wireless sensors on a portable wireless device within the secured geographic area based upon a respective relative distance between the portable wireless device and each of the at least some of the plurality of wireless sensors, the portable wireless device transmitting a wireless instruction to one of the at least some of the plurality of wireless sensors based upon its location within the list, and the one of the at least some of the plurality of wireless sensors confirming the wireless instruction via a control panel of the security system and, in turn, executing the wireless instruction.

17 Claims, 3 Drawing Sheets

(56) References Cited

U.S. PATENT DOCUMENTS

| | | | |
|---|---|---|---|
| 2015/0319046 A1* | 11/2015 | Plummer | H04L 41/22 715/736 |
| 2016/0065414 A1* | 3/2016 | Sundermeyer | G06F 3/04883 370/254 |
| 2016/0077532 A1* | 3/2016 | Lagerstedt | H04W 4/02 700/277 |
| 2016/0189505 A1* | 6/2016 | Boettcher | G08B 13/22 340/541 |

* cited by examiner

METHOD OF PERFORMING SENSOR OPERATIONS BASED ON THEIR RELATIVE LOCATION WITH RESPECT TO A USER

FIELD

This application relates to security systems and, more particularly, to the interfaces of security systems.

BACKGROUND

Systems are known to protect people and assets within secured areas. Such systems are typically based upon the use of one or more sensors that detect threats within the secured areas.

Threats to people and assets may originate from any of a number of different sources. For example, a fire may kill or injure occupants who have become trapped by a fire in a home. Similarly, carbon monoxide from a fire may kill people in their sleep.

Alternatively, an unauthorized intruder, such as a burglar, may present a threat to assets within the areas. Intruders have also been known to injure or kill people living within the areas.

In the case of intruders, sensors may be placed in different areas based upon the respective uses of those areas. For example, if people are present during some portions of a normal day and not at other times, then sensors may be placed along a periphery of a space to provide protection while the space is occupied while additional sensors may be placed within an interior of the space and used when the space is not occupied.

In most cases, threat sensors are connected to a local control panel. In the event of a threat detected via one of the sensors, the control panel may sound a local audible alarm. The control panel may also send a signal to a central monitoring station.

While conventional security systems work well, they are sometimes overly complex and difficult to use. Accordingly, a need exists for better methods and apparatus for operating secured systems.

DETAILED DESCRIPTION

Figure 1:
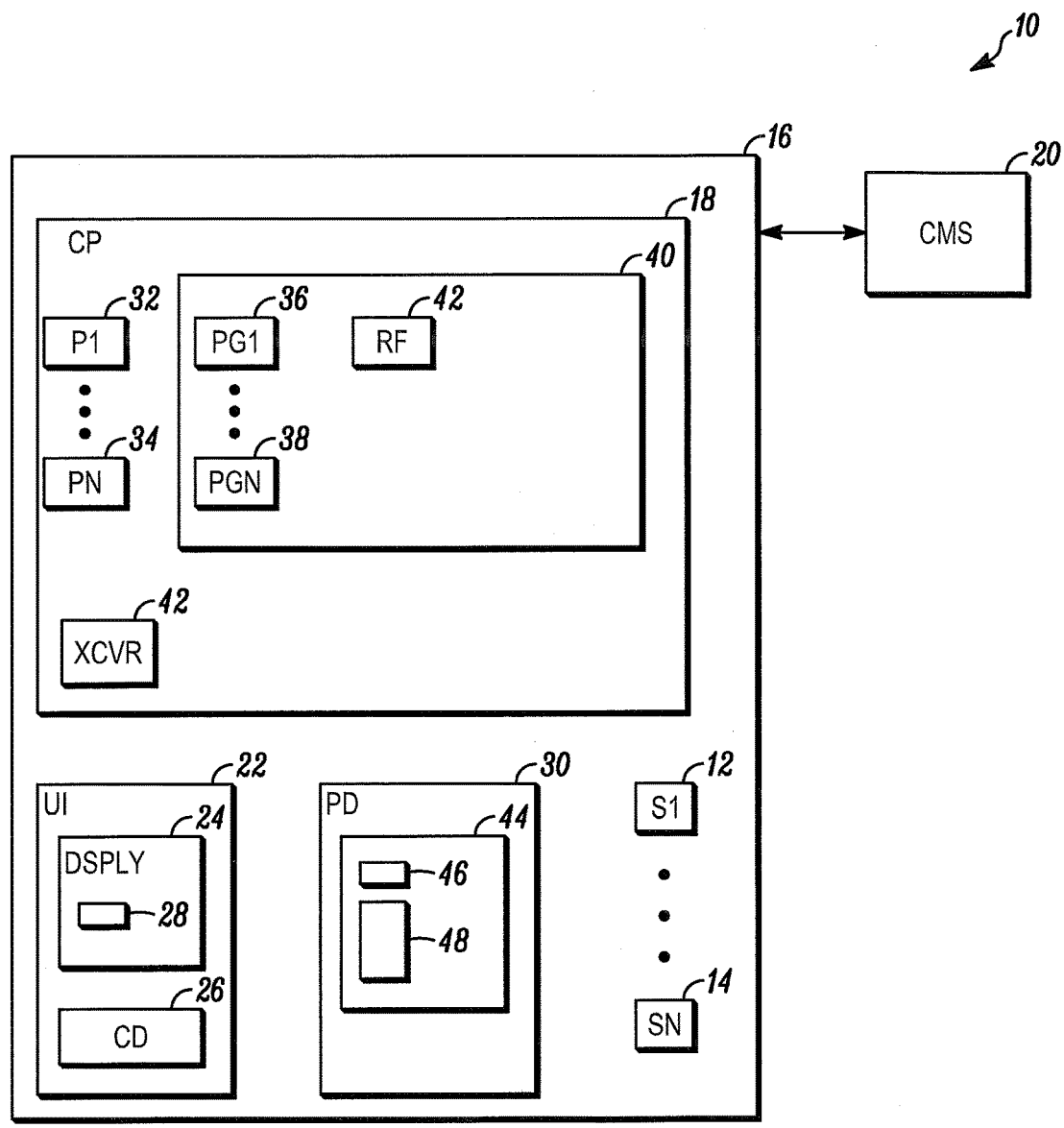
FIG. 1 is a block diagram of a security system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or the claims to the specific embodiment illustrated.

FIG. 1 depicts a security system 10 shown generally in accordance with an illustrated embodiment. Included within the system are a number of wireless threat sensors 12, 14 that detect threats within a secured geographic area 16.

Threats detected by the sensors may originate from any of a number of different sources. For example, at least some of the sensors may be limit switches placed on the doors and windows on a periphery of the secured area in order to detect intruders entering the secured area. Other ones of the sensors may be passive infrared (PIR) detectors or closed circuit television (CCTV) cameras with motion detection capability placed within the interior of the secured area to detect intruders who have been able to circumvent the sensors along the periphery. Still other ones of the sensors may environmental detectors (e.g., smoke, gas, etc.).

The sensors may be monitored by a control panel 18 either located within the secured area as shown in FIG. 1 or located remotely. Upon detecting activation of one of the sensors, the control panel sends an alarm message to a central monitoring station 20. The central monitoring station may respond by summoning help (e.g., the fire department, police, etc.).

The security system may be controlled through a user interface 22. The user interface includes a display 24 that displays status information and a control device (e.g., a keyboard) 26 for entry of control instructions. Alternatively, the display and the control device of the user interface may be combined into a touchscreen display.

Authorized users may arm the security system by activating an arm stay or arm away key through the user interface. Similarly, the user may disarm the system by entering a personal identification number (PIN) and a disarm key through the user interface.

The system may also include a portable wireless control device 30. The portable device may be used for local control of each of the sensors.

Included within the control panel, the user interface, the portable device and each of the sensors may be one or more processor apparatuses (processors) 32, 34 each operating under control of one or more computer programs 36, 38 loaded from a non-transient computer readable medium (memory) 40. As used herein, reference to a step performed by a computer program is also reference to the processor that executed that step.

Also included within the control panel, the portable device, and each of the sensors is a radio frequency transceiver 42. The respective radio frequency transceivers within each of the sensors and the control panel are used to establish a wireless link between the control panel and each of the sensors.

Once armed, an alarm processor within the control panel may monitor the status of each of the sensors via a corresponding wireless link. Upon activation of one of the sensors, the alarm processor may compose and send the alarm message to the central monitoring station. The alarm message may include an identifier of the alarm system (e.g., an account number, address, etc.), an identifier of the activated sensor, and the time.

The portable device may be a wearable device (e.g., a wristwatch). Alternatively, the portable device may be embodied as a smartphone.

In order to use the portable device, it may first be registered through the user interface. Registration, in this case, means transferring identification information (e.g., an electronic serial number) from the portable device to the control panel and saving the identification information in a registration file 42. In some cases, registration may also be accompanied by entry of a PIN by an authorized human user. Registration may be initiated by concurrently activating a registration button on the user interface and also on a keyboard of the portable device.

Once registered, the portable device may interact and control nearby sensors. For example, as the user of the portable device travels through the secured area, the transceiver of the portable device may constantly monitor for and detect nearby sensors.

Upon detecting a sensor, a signal level processor within the portable device may measure a signal level of each nearby sensor. As each sensor is detected and measured, a sorting processor may sort or otherwise order the sensor into a sensor list based upon the signal level.

The user of the portable device may display and review a list of nearby sensors by activating an appropriate display sensors icon 46 on a display 44 of the portable device. Upon activating the display sensors icon, the sorting processor may display the list 48 of nearby sensors on the display with the nearest sensor shown first.

From time to time, it may be necessary for a user to interrogate or otherwise change the operation of a nearby sensor. This may be appropriate, for instance, where the user wants to open a window without triggering an alarm. In this case, the user may want to temporarily bypass the sensor.

In order to bypass the sensor, the user may select the display sensors icon to retrieve and display a list of nearby sensors. From the list, the user may select the sensor attached to the window. The user may identify the sensor within the list by name or by moving the portable device around the room and watching the sensors become rearranged on the list based upon distance from the portable device.

Upon selecting the window sensor, a monitoring processor within the portable device may present a list of possible instructions that the user wants to execute with regard to the sensor. For example, the list may include entries for bypassing the sensor, deactivating the sensor, determining a battery status, and renaming the sensor.

If the user should select the bypass instruction, then an instruction processor may send a message to the window sensor requesting execution of the bypass instruction. The message to the sensor may include an identifier of the bypass instruction, an identifier of the portable device, the PIN of the user, and a time of transmission.

The window sensor may receive the message through its transceiver and process the message accordingly. As a first step, a messaging processor within the sensor may send the message back to the control panel along with an indicator that the message was received from a nearby portable control device. Sending the message back to the control panel allows the message to be authenticated by the control panel before further processing of the message.

Within the control panel, an authentication processor may authenticate the identifier of the portable device as being previously registered with the control panel. This may be necessary to ensure that the message is not simply a hacking attempt by an unauthorized person seeking to defeat the sensor. The authentication processor may authenticate the message by comparing the identifier(s) of the portable device received from the sensor with one or more identifiers previously saved in the memory of the control panel during registration of the portable device.

Once the portable device has been authenticated, the instruction from the portable device may be executed. Execution of the instruction from the portable device may be performed in the control panel, in the sensor that received the instruction, or both. For example, a bypass instruction may simply involve the setting of a flag in the control panel to disregard any activation message from the bypassed sensor. The bypass instruction may also include sending a separate message to the sensor deactivating the sensor.

In either case, the control panel sends a message to the sensor confirming the authentication of the portable device. The message may also include an instruction for the sensor to enter a deactivated standby or bypass mode. In either case, the sensor sends a confirmation message to the portable device confirming execution of the instruction. In the case of a bypass instruction, the portable device may then display the message "WINDOW SENSOR BYPASSED."

In this case, the bypass instruction is cleared upon subsequent entry of a disarm command. If the message had been a sensor disable command, then the sensor would have been disabled until such time as the sensor was again intentionally enabled.

In another example, the user may select a rename sensor instruction from the list of possible instructions that could be performed with respect to the selected sensor. In this case, the sensor confirms the authenticity of the instruction and then may present a text window on the portable device for entry of a new name for the sensor. The window may also present the old name. The user enters the new name and activates an enter button. In response, the sensor may send the new name back to the control panel where a naming processor may enter the new name for the sensor and download the appropriate changes to the sensor.

Alternatively, the user may activate a determine battery status button. The sensor may again validate the instruction and then execute the instruction from within the sensor. In this case, a battery level processor reads a battery level and then sends an indication of that read level to the portable device. The battery level may be shown on the display of the portable device.

A typical prior art intrusion system includes a control or a security panel through which a user may control the intrusion system and the sensors in each particular zone linked to the control panel. These zones may be grouped into partitions. Each partition may be armed/disarmed through the control panel, which causes the zones and, hence, the devices in the zones to be active or to remain passive.

The devices in the zones may be bypassed by executing the bypass command from the control panel after identifying the zone that a sensor belongs to based on the zone descriptor used. This may be done when the device becomes faulty or needs to be temporarily disabled. For example, suppose the user enters a room and needs to bypass a sensor for a short period of time. In this case, he/she would need to go back to the control panel and recall the name he/she has given the sensor to bypass the sensor. Often this is quite tedious, especially if the sensor is far from the control panel.

The correct identification of the sensor depends on the name the user has given to it while registering the device at the time of installation. If multiple sensors are nearby in a room and the user doesn't remember the name given to the sensor, then bypassing or disabling would be a trial and error process.

The system of FIG. 1 provides a convenient way of identifying sensors and performing discrete operations on the sensors that are both intuitive and straightforward. The solution includes an application that may be installed in a wearable device, such as a smart watch, and that can interact directly with the sensors over an RF link.

The device on which the application is installed is pre-registered with the control panel after logging into a configuration tool of the control panel based upon the user's credentials. After registration, the particular device (in this case, smart watch) would be subsequently identified as belonging to the user whose login was used for registration. During use, the device identification is obtained from its serial number. After the user selects a sensor from the wearable device, he/she may perform discrete operations on the sensor, such as bypassing of the sensor, deactivation of the sensor, changing the name, checking the battery status, etc.

For example, suppose the user, through the wearable device, requests an action, such as bypass. The sensor receives the command and sends the command to the panel along with other details (e.g., the wearable device serial number, credential of the user who performed the command, etc.). The panel then executes the command if the user credentials and the serial number are valid and then prompts the sensor to send feedback to the wearable device that initiated the command.

Figure 2:
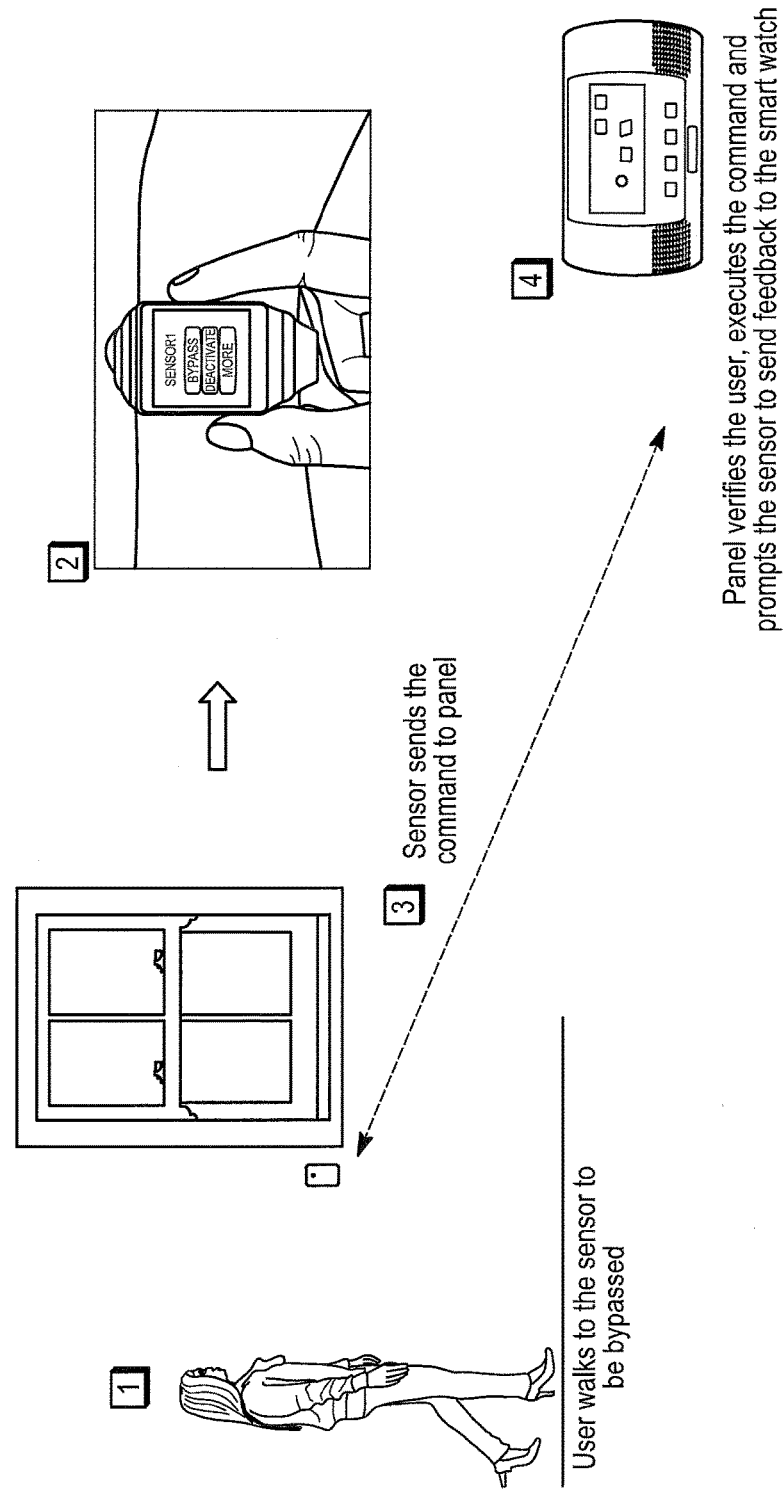
FIG. 2 graphically depicts a set of steps performed by the system of FIG. 1.
Figure 3:
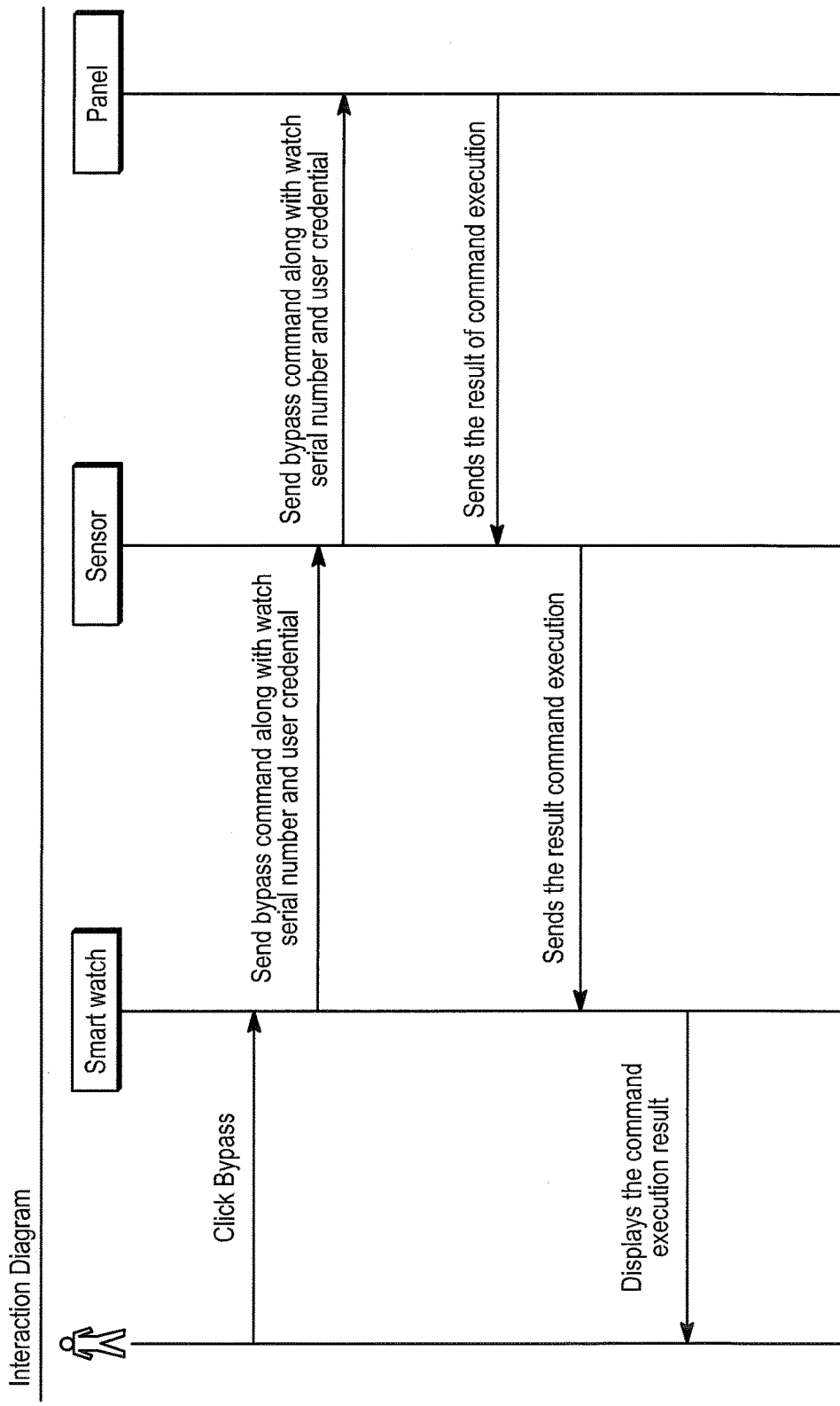
FIG. 3 depicts signal flow within the system of FIG. 1.

As a more specific example, assume that a user walks into a room where a sensor is installed near the window and is monitoring a set of window contacts. The user needs to open the window temporarily. The user is wearing a smart watch that is registered with the panel. FIG. 2 graphically depicts the steps of the process while FIG. 3 depicts signal flow.

Once the user reaches the area of the sensor, he/she checks his/her watch to see and identify the particular sensor. Since he/she is closest to the window contact sensor, it would be displayed at the top of the list of nearby sensors shown on the watch.

The user clicks on the sensor at the top of the list on the smart watch. This displays a list of options to bypass, rename, deactivate, etc. Since the user wants to bypass the sensor, he/she selects bypass. The sensor receives this command from the smart watch and sends the command to the control panel along with the smart watch serial number that came as part of the command and the user credentials. The control panel validates the information, and since it finds that the user is a valid user and the smart watch is a registered device, it bypasses the sensor and sends feedback to the sensor. The sensor receives the reply and sends the status to the smart watch. Once the user receives the feedback that the sensor has been bypassed, the user opens the window.

The system of FIG. 1 offers a number of advantages. For example, the system allows a user to perform sensor modifications at any point near the sensor without going back to the control panel. The system solves the problem of the user needing to recall the name of a sensor before performing any discrete action on the sensor. Installation of devices becomes less painful as the user need not provide any more descriptive information to zones than what is necessary. Customization of sensors, such as descriptions, may be done remotely at the device rather than from the control panel while in the programming mode.

The security of the watch is reliability. The wearable watch is preregistered with the control panel, and user's credentials act as an extra check to ensure that the person performing the operation is a valid user.

The wearable device may be programmed to support an RF based interface so that it can interact with the sensors directly. Many panel configuration tools already provide an option to register devices, such as keypads. This may be extended to allow registration of a wearable device against the user code.

The system of FIG. 1 may be extended to devices other than RF sensors (e.g., home automation devices) by providing an interface for the devices and to other communication protocols. This will allow the user to perform a number of unique discrete home automation actions.

In general, the system performs a set of unique steps, including providing a plurality of wireless sensors of a security system that detect threats within a secured geographic area, displaying a list of at least some of the plurality of wireless sensors on a portable wireless device within the secured geographic area based upon a respective relative distance between the portable wireless device and each of the at least some of the plurality of wireless sensors, the portable wireless device transmitting a wireless instruction to one of the at least some of the plurality of wireless sensors based upon its location within the list, the one of the at least some of the plurality of wireless sensors confirming the wireless instruction via a control panel of the security system and, in turn, executing the wireless instruction.

Alternatively, the system may include a plurality of wireless sensors of a security system that detect threats within a secured geographic area, a list of at least some of the plurality of wireless sensors displayed on a portable wireless device within the secured geographic area based upon a respective relative distance between the portable wireless device and each of the at least some of the plurality of wireless sensors, a processor of the portable wireless device that transmits a wireless instruction to one of the at least some of the plurality of wireless sensors based upon its location within the list, and a processor of the one of the at least some of the plurality of wireless sensors that confirms the wireless instruction via a control panel of the security system and that, in turn, executes the wireless instruction.

Alternatively, the system may include a security system that protects a secured geographic area, a plurality of wireless sensors that detect threats within the secured geographic area, a portable wireless device within the secured geographic area that detects a signal from nearby sensors of the plurality of wireless sensors, a list of at least some of the nearby sensors displayed on the portable wireless device within the secured geographic area based upon a respective relative distance between the portable wireless device and each of the at least some of the nearby sensors, a processor of the portable wireless device that receives a selected instruction through a user interface of the portable wireless device and wirelessly transmits the selected instruction to one of the at least some of the nearby sensors based upon its location within the list, and a processor of the one of the at least some of the nearby sensors, that confirms the selected instruction via a control panel of the security system and that executes the selected instruction.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, may be eliminated from the described flows, and other components may be added to or removed from the described embodiments.

The invention claimed is:
1. A method comprising:
   providing a plurality of wireless sensors of a security system that detects threats within a secured geographic area;
   displaying a list of at least some of the plurality of wireless sensors on a portable wireless device within the secured geographic area based upon a respective relative distance between the portable wireless device and each of the at least some of the plurality of wireless sensors;

the portable wireless device transmitting a sensor-executable instruction to one of the at least some of the plurality of wireless sensors based upon a location of the one of the at least some of the plurality of wireless sensors within the list;

the one of the at least some of the plurality of wireless sensors confirming the sensor-executable instruction via a control panel of the security system; and the one of the at least some of the plurality of wireless sensors executing the sensor-executable instruction, wherein the sensor-executable instruction comprises one of bypassing the one of the at least some of the plurality of wireless sensors, deactivating the one of the at least some of the plurality of wireless sensors, determining a battery status of the one of the at least some of the plurality of wireless sensors, and renaming the one of the at least some of the plurality of wireless sensors.

2. The method as in claim 1 wherein the portable wireless device includes a watch or a smartphone.

3. The method as in claim 1 wherein confirming the sensor-executable instruction via the control panel of the security system comprises authenticating the portable wireless device.

4. The method as in claim 3 wherein authenticating the portable wireless device comprises registering the portable wireless device with the control panel.

5. The method as in claim 4 wherein registering the portable wireless device with the control panel comprises the control panel receiving a personal identification number from a user of the portable wireless device.

6. The method as in claim 1 further comprising determining a respective signal strength of a respective signal from each of the at least some of the plurality of wireless sensors.

7. The method as in claim 6 further comprising ordering a respective name of each of the at least some of the plurality of wireless sensors on the list based upon the respective signal strength.

8. An apparatus comprising:
a plurality of wireless sensors of a security system that detects threats within a secured geographic area;
a list of at least some of the plurality of wireless sensors displayed on a portable wireless device within the secured geographic area based upon a respective relative distance between the portable wireless device and each of the at least some of the plurality of wireless sensors;
a processor of the portable wireless device that transmits a sensor-executable instruction to one of the at least some of the plurality of wireless sensors based upon a location of the one of the at least some of the plurality of wireless sensors within the list; and
a processor of the one of the at least some of the plurality of wireless sensors that confirms the sensor-executable instruction via a control panel of the security system and that executes the sensor-executable instruction,
wherein the sensor-executable instruction comprises one of bypassing the one of the at least some of the plurality of wireless sensors, deactivating the one of the at least some of the plurality of wireless sensors, determining a battery status of the one of the at least some of the plurality of wireless sensors, and renaming the one of the at least some of the plurality of wireless sensors.

9. The apparatus as in claim 8 wherein the portable wireless device comprises a watch or a smartphone.

10. The apparatus as in claim 8 wherein the processor of the one of the at least some of the plurality of wireless sensors confirms the sensor-executable instruction by authenticating the portable wireless device.

11. The apparatus as in claim 8 further comprising a processor of the control panel that registers the portable wireless device with the control panel.

12. The apparatus as in claim 11 wherein the processor of the control receives a user personal identification number (PIN) from a user of the portable wireless device and compares the user PIN with a reference PIN in memory.

13. The apparatus as in claim 8 wherein the processor of the portable wireless device determines a respective signal strength of a respective signal from each of the at least some of the plurality of wireless sensors.

14. The apparatus as in claim 13 wherein the processor of the portable wireless device orders a respective name of each of the at least some of the plurality of wireless sensors on the list based upon the respective signal strength.

15. An apparatus comprising:
a security system that protects a secured geographic area;
a plurality of wireless sensors that detects threats within the secured geographic area;
a portable wireless device within the secured geographic area that detects signals from nearby sensors of the plurality of wireless sensors;
a first list of at least some of the plurality of wireless sensors displayed on the portable wireless device within the secured geographic area based upon a respective relative distance between the portable wireless device and each of the at least some of the plurality of wireless sensors;
a processor of the portable wireless device that receives a sensor-executable instruction through a user interface of the portable wireless device and wirelessly transmits the sensor-executable instruction to one of the at least some of the plurality of wireless sensors based upon a location of the one of the at least some of the plurality of wireless sensors within the first list; and
a processor of the one of the at least some of the plurality of wireless sensors that confirms the sensor-executable instruction via a control panel of the security system and that executes the sensor-executable instruction,
wherein the sensor-executable instruction comprises one of bypassing the one of the at least some of the plurality of wireless sensors, deactivating the one of the at least some of the plurality of wireless sensors, determining a batter status of the one of the at least some of the plurality of wireless sensors, and renaming the one of the at least some of the plurality of wireless sensors.

16. The apparatus as in claim 15 wherein the processor of the portable wireless device receives a selection of the one of the at least some of the plurality of wireless sensors through the user interface of the portable wireless device.

17. The apparatus as in claim 15 wherein the processor of the portable wireless device presents a second list of possible instructions for execution by the one of the at least some of the plurality of wireless sensors.

* * * * *